Figure 1:
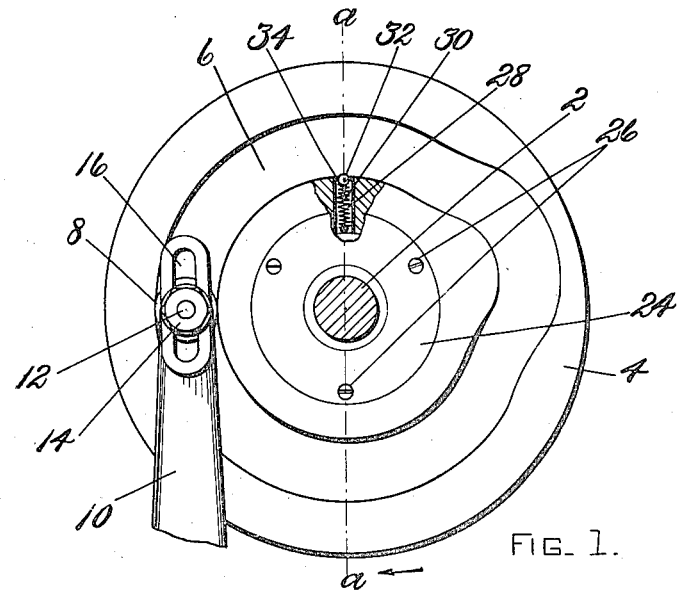

G. A. AMBLER.
LUBRICATING DEVICE.
APPLICATION FILED AUG. 6, 1906.

1,028,176.

Patented June 4, 1912.

WITNESSES  
John H. Ruckman  
Frederick L. Edmands

INVENTOR  
George A. Ambler  
By his Attorney,  
Nelson N. Howard

UNITED STATES PATENT OFFICE.

GEORGE A. AMBLER, OF WINCHESTER, MASSACHUSETTS, ASSIGNOR TO UNITED SHOE MACHINERY COMPANY, OF PATERSON, NEW JERSEY, A CORPORATION OF NEW JERSEY.

LUBRICATING DEVICE.

1,028,176. Specification of Letters Patent. Patented June 4, 1912.

Application filed August 6, 1906. Serial No. 329,396.

*To all whom it may concern:*

Be it known that I, GEORGE A. AMBLER, a citizen of the United States, residing at Winchester, in the county of Middlesex and Commonwealth of Massachusetts, have invented certain Improvements in Lubricating Devices, of which the following description, in connection with the accompanying drawings, is a specification, like reference characters on the drawings indicating like parts in the several figures.

This invention relates to devices for lubricating friction-surfaces, more particularly cam-surfaces which rotate at a high speed. For the operator to keep such surfaces properly lubricated manually would consume a great deal of time.

The object of this invention is to provide means for automatically supplying a lubricant to such surfaces in sufficient quantity to insure their proper lubrication without waste. This object is accomplished by providing a receptacle for the lubricant from which it is fed to the friction-surfaces in small quantities by centrifugal force. The receptacle is preferably formed by cutting out a chamber in a body which is designed to be rotated. The receptacle and the friction-surfaces are connected by a passage within which there is preferably a valve normally held upon a valve-seat in position to be opened at intervals by a suitable actuating mechanism to permit the flow of lubricant to the friction-surfaces.

In the particular embodiment of the invention herein shown, the rotatable body consists of a cam-disk. A valve is seated in the passage connecting the receptacle and the cam-surface so that it is normally in position to be opened once during every rotation of the cam disk by the member which is in engagement with the cam-surface. It is desirable that the valve have a rounded surface to ride upon the member just referred to, and for this purpose a ball-valve has been found to be convenient. The receptacle for the lubricant is preferably provided with two closures, one to permit the lubricant to be supplied to said receptacle, and the other to close the open end of the receptacle, said open end being produced when the cam-disk is cut out to form a chamber.

Figure 2:
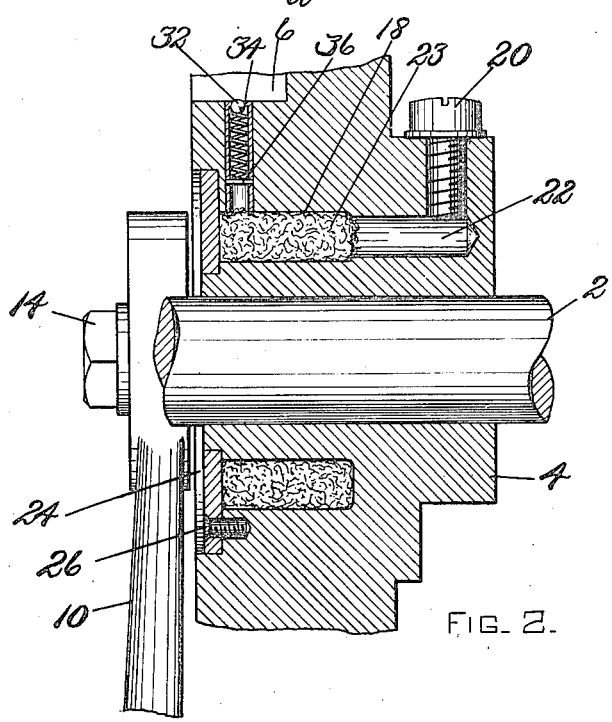

Referring to the drawings,—Figure 1 is a view of the device in side elevation with a portion broken away; Fig. 2 is a sectional view on the line *a—a* of Fig. 1 looking in the direction of the arrow.

The shaft 2 carries a cam-disk 4 having a cam-groove 6. The roller 8 which runs in this groove is secured on an arm or lever 10 by means of a bolt 12 and a nut 14. The bolt passes through a slot 16 in the arm to permit adjustment of the roller. A receptacle 18 is formed in the cam-disk by cutting out a portion to form a chamber. A plug 20 closes a duct 22 which leads to said receptacle. Within the receptacle may be placed absorbent material 23 such as wool. The open end of the chamber is closed by a plate 24 removably secured to the cam-disk by screws 26. From the receptacle a passage 28 for the escape of oil leads to the cam-groove 6. A spring 30 in this passage holds the valve 32 upon a valve-seat 34, the end of the spring, which is opposite to the valve, resting upon a pin or shoulder 36. The valve is preferably a steel ball which is mounted so that it projects into the cam-groove sufficiently to be engaged by the roller 8.

The operation of the device is as follows:—The receptacle 18 is filled with oil, or other lubricant which is introduced through the duct 22, the plug 20 having been removed. When this has been done the plug is put in place and the machine may then be started. It is designed to be rotated at a high rate of speed and the centrifugal force forces the oil from the chamber into the passage 28 against the valve 32 which is normally held closed by the spring 30. The valve is opened once for every rotation of the cam-disk by engagement with the roller 8 and a small quantity of lubricant is permitted to escape. The cam-surface is thus kept properly lubricated without requiring the attention of the operator except to keep a sufficient quantity of oil in the receptacle 18. The absorbent material 23 may be renewed whenever desired by removing the plate 24.

A detailed description of a complete device has been given but it is evident that various changes in arrangement and in details may be made without departing from the spirit of the invention.

Having described my invention, what I claim as new and desire to secure by Letters Patent of the United States is:—

1. A device of the class described provided with a friction surface and having in combination a receptacle for a lubricant, said receptacle and surface being connected by a passageway into which the lubricant is urged by centrifugal force, and means controlling the flow of lubricant through said passageway and arranged to effect an intermittent feed of lubricant to said surface.

2. A device of the character described having a friction surface and a chamber for lubricating material, means supporting said device for movement, said device having a passageway connecting said chamber and said friction surface, said passageway being so located with reference to the direction of movement of the device that the lubricant is urged into said passageway by said movement, a valve controlling the flow of lubricant through said passageway and means in frictional engagement with said surface for operating said valve.

3. In a device of the class described, the combination with a rotatable cam having a chamber for a lubricant located interiorly with respect to the cam-surface, of a valve between said chamber and cam-surface against which the lubricant is fed by centrifugal force, and means for opening said valve at intervals.

4. In a device of the class described, the combination with a cam having a chamber for a lubricant, of a valve located in a passage connecting said chamber and the cam-surface and provided with a valve-seat at the outer end of said passage upon which it is normally seated, and means for opening said valve at intervals.

5. In a device of the class described, the combination with a rotatable cam having a chamber for a lubricant, of a removable closure for said chamber to permit the introduction of the lubricant, and means whereby the lubricant is fed intermittently from said chamber to the cam-surface by centrifugal force.

6. In a device of the class described, the combination with a cam-disk having a cam-groove and a chamber for containing oil, of a valve located in a passage connecting said groove and chamber and provided with a valve-seat upon which it is normally seated, and a member which runs in said groove in actuating relation to said valve.

7. In a device of the class described the combination of a cam, a member having frictional engagement therewith, a reservoir for lubricating material carried by one of said devices, said reservoir being connected with the friction surface of its supporting device by a passage into which the lubricant is urged by the motion of the device, and means operated by the co-action between said member and cam for controlling the flow of lubricant through said passage.

In testimony whereof I have signed my name to this specification in the presence of two subscribing witnesses.

GEORGE A. AMBLER.

Witnesses:
JOHN H. RUCKMAN,
ARTHUR L. RUSSELL.